United States Patent [19]
Perez et al.

[11] Patent Number: 4,822,685
[45] Date of Patent: Apr. 18, 1989

[54] METHOD FOR PREPARING MULTI-LAYERED COATED ARTICLES AND THE COATED ARTICLES PREPARED BY THE METHOD

[75] Inventors: Leon A. Perez; Marvis E. Hartman, both of Pittsburgh, Pa.; Naomi R. Suss, Westlake

[73] Assignee: PPG Industries, Inc., Pittsburgh, Pa.

[21] Appl. No.: 130,923

[22] Filed: Dec. 10, 1987

[51] Int. Cl.[4] .......................... B05D 1/36; B05D 7/00; B32B 27/00; B32B 27/40
[52] U.S. Cl. ............................. 428/423.3; 427/407.1; 427/409
[58] Field of Search .................. 427/388.4, 407.1, 409; 428/423.1, 425.8, 423.3

[56] References Cited

U.S. PATENT DOCUMENTS

| | | | |
|---|---|---|---|
| 3,169,945 | 2/1965 | Hostettler et al. | 260/78.3 |
| 3,479,310 | 11/1969 | Dieterich et al. | 260/29.2 |
| 3,639,147 | 2/1972 | Benefiel et al. | 117/73 |
| 3,870,684 | 3/1975 | Witt et al. | 260/75 NH |
| 3,905,929 | 9/1975 | Noll | 260/29.2 TN |
| 3,919,351 | 11/1975 | Chang et al. | 427/421 X |
| 4,046,729 | 9/1977 | Scriven et al. | 106/243 X |
| 4,066,591 | 1/1978 | Scriven et al. | 428/262 X |
| 4,098,743 | 7/1978 | Scriven et al. | 528/80 X |
| 4,115,472 | 9/1978 | Porter et al. | 428/425 X |
| 4,147,679 | 4/1979 | Scriven et al. | 428/262 X |
| 4,147,688 | 4/1979 | Makhlouf et al. | 526/273 X |
| 4,220,679 | 9/1980 | Buckhouse | 427/401 |
| 4,290,932 | 9/1981 | Wright et al. | 525/198 X |
| 4,301,053 | 11/1981 | Wolfrey | 428/412 X |
| 4,315,053 | 2/1982 | Poth et al. | 428/423.7 |
| 4,369,225 | 1/1983 | Manaba et al. | 428/334 |
| 4,381,332 | 4/1983 | Falmer et al. | 428/288 |
| 4,403,003 | 9/1983 | Buckhouse | 427/407.1 |
| 4,408,008 | 10/1983 | MacKusch | 524/591 |
| 4,410,668 | 10/1983 | Picoirilli et al. | 525/440 |
| 4,485,228 | 11/1984 | Chang et al. | 528/84 |
| 4,489,135 | 12/1984 | Drexler et al. | 428/423.1 |
| 4,524,192 | 6/1985 | Alexander et al. | 525/440 |
| 4,529,632 | 7/1985 | Fujii et al. | 427/409 |
| 4,533,703 | 10/1985 | Kordomeros et al. | 525/440 |
| 4,540,766 | 9/1985 | Chang et al. | 528/45 |
| 4,554,308 | 11/1985 | Russiello | 524/591 |
| 4,652,466 | 3/1987 | Thoma et al. | 427/244 |
| 4,719,132 | 1/1988 | Porter | 427/409 |

FOREIGN PATENT DOCUMENTS

| | | |
|---|---|---|
| 837174 | 3/1970 | Canada . |
| 234361 | 9/1987 | European Pat. Off. . |
| 234362 | 9/1987 | European Pat. Off. . |
| 967051 | 8/1964 | United Kingdom . |

Primary Examiner—Michael Lusignan
Attorney, Agent, or Firm—Linda Pingitore

[57] ABSTRACT

A method of forming a multilayered coating on a substrate involves the steps of:

(I) applying to the surface of a substrate an aqueous based film forming composition comprising color pigments and an aqueous polyurethane dispersion comprising the reaction product of:
  (a) a substantially branched, isocyanate containing prepolymer; and
  (b) a polyamine having primary and/or secondary amino groups;
(II) applying a clear film forming composition over the basecoat of step (I);
(III) allowing the clear composition of step (II) to at least partially dry or cure to form a transparent topcoat over said basecoat.

33 Claims, No Drawings

METHOD FOR PREPARING MULTI-LAYERED COATED ARTICLES AND THE COATED ARTICLES PREPARED BY THE METHOD

BACKGROUND OF THE INVENTION

The present invention relates to methods for the preparation of multi-layered coated articles and to the resultant coated articles.

In the coating of substrates such as, for example, automobiles, where a coating is desired which provides not only a lustrous appearance but also good corrosion protection, it has been well appreciated to provide the substrate with several coating layers in order to achieve the desired effect. Therefore, typically a pigmented coating composition is first applied to the substrate followed by a transparent topcoat. By transparent is meant a clear coating, that is, one which does not contain pigmentation or contains only transparent pigments. Such a coating system is commonly referred to as a "clear-over-color" or "color plus clear".

In the area of automotive coatings, metallic pigments such as aluminum flake are generally utilized to obtain the glossy lustrous appearance which is characteristically sought. In order to achieve the preferred appearance of such metallic coating compositions it is very important that the metallic pigment orient such that it is parallel to the coated surface. The alignment of the pigment in this fashion provides for the most desirable appearance, especially with respect to the "flop" of the coating. By "flop" is meant the visual change in brightness or lightness of the metallic aluminum flake with a change in viewing angle, that is, a change of from 90 to 180 degrees. The greater the visual change from light to dark appearance, the better the flop. The flop accentuates the lines and curves of an automobile; therefore, it is very important in achieving the sought after appearance of the coating.

In addition to "flop", another very important feature required of color plus clear systems is good "strike in" ("soak-in") resistance of the base coat. By "strike in" resistance is meant the ability of the basecoat composition of a multi-coat system to resist attack by the solvents in the topcoat composition. The topcoat "striking in" to the basecoat is particularly undesirable since it adversely affects alignment of the metallic pigment and reduces or eliminates the "flop" and the gloss of the topcoat. The strike in is a problem because the automobile manufacturers generally wish to apply the topcoat composition to the basecoat composition in a color plus clear system by a "wet-on-wet" technique. By this is meant that the basecoat composition is applied to the substrate followed by the topcoat composition and then a single baking step is utilized to cure the composite coating. The problem of the topcoat "striking-in" to the basecoat is particularly pronounced with high solids clear topcoating compositions which are formulated from low molecular weight polymers.

Aqueous based coating compositions are particularly desirable for use in the basecoat of multi-layered coating systems because they provide very bright coatings with exceptional flop. Aqueous polyurethane dispersions are particularly desirable as binders in such multicoat systems. For example, U.S. Pat. No. 4,489,135 to Drexler et al discloses a process for preparing a multilayer coating wherein the coating agent for the base layer contains as a binder an aqueous polyurethane dispersion which has been prepared from among other components, a linear polyether diol and/or polyester diol having terminal hydroxyl groups and having a specified molecular weight. Aqueous polyurethane dispersions such as those of Drexler et al which are prepared from linear diols quite often have difficulties associated with them. For example the polyurethane dispersion typically requires the presence of an external emulsifying agent or alternatively, the incorporation of hydrophilic monomers into the backbone of the polyurethane in order to achieve the requisite stability of the dispersion. Typically the strike in resistance of coating compositions prepared from such dispersions is not optimum.

SUMMARY OF THE INVENTION

In accordance with the present invention there is provided a method of forming a multi-layered coating on a substrate, comprising:
(I) applying to the surface of a substrate an aqueous based film forming composition comprising color pigments and an aqueous polyurethane dispersion comprising the reaction product of:
  (a) a substantially branched, isocyanate containing prepolymer; and
  (b) a polyamine having primary and/or secondary amino groups;
(II) applying a clear film forming composition over the basecoat of step (I);
(III) allowing the clear composition of step (II) to at least partially dry or cure to form a transparent topcoat over said basecoat.

Also in accordance with the present invention there is provided a method of forming a multi-layered coating on a substrate comprising both metallic and elastomeric parts, comprising:
(I) applying to the surface of a substrate an aqueous based film forming composition comprising color pigments and an aqueous polyurethane dispersion comprising the reaction product of:
  (a) a substantially branched, isocyanate containing prepolymer; and
  (b) a polyamine having primary and/or secondary amino groups;
(II) applying to said basecoat of step (I) a clear film-forming composition of a two-package organic solvent based system comprising a polyurethane polyol and a polyisocyanate.
(III) allowing the clear composition of step (II) to at least partially cure to form a transparent topcoat over the basecoat.

Also provided are coated articles prepared in accordance with the aforedescribed methods.

DETAILED DESCRIPTION OF THE INVENTION

The first step of the claimed method comprises applying to the surface of the substrate an aqueous based film forming composition comprising as a principal ingredient an aqueous polyurethane dispersion. The polyurethane dispersion comprises the reaction product of an aqueously dispersed, substantially branched isocyanate containing prepolymer; and a polyamine having primary and/or secondary amino groups.

The isocyanate containing prepolymer can be prepared by reacting an active hydrogen containing component with a polyisocyanate component. The active hydrogen containing component and the polyisocyanate are selected such that the isocyanate containing prepolymer is substantially branched. For the purposes of this application the term "substantially branched" means that the prepolymer is derived from at least 20 milliequivalents of a material having a functionality greater than two.

The active hydrogen containing component preferably comprises a source of hydroxyl groups and also a source of ionic salt groups so that the polyurethane polymer has ionic salt groups incorporated into the polymer backbone such that the polymer can be dispersed into water. Examples of ionic salt groups are anionic salt groups selected from the class consisting of $-OSO_3^-$, $-OPO_3^=$, $-COO^-$, $-SO_2O^-$, $-POO^-$ and $PO_3^=$. Preferably the polyurethane polymer is prepared with reactants containing a carboxylic acid group which can be subsequently neutralized after polyurethane formation. Suitable materials for introducing caboxylic acid groups into the polyurethane are compounds which have two groups which are reactive toward isocyanate groups and at least one group which is capable of forming an anion. Examples of such compounds are hydroxy and mercapto carboxylic acids. Specific examples include dimethylolpropionic acid, which is preferred, glycolic acid and lactic acid. Other examples of materials which contain active hydrogens and acid groups are amino carboxylic acids, amino hydroxy carboxylic acids, sulfonic acids, hydroxy sulfonic acids and amino sulfonic acids. Examples include oxaluric acid, anilido acetic acid, glycine, 6-amino-caprylic acid, hydroxyethylpropionic acid, 2-hydroxyethane sulfonic acid and sulfanilic acid. The amino acids must be used in the presence of base such as potassium hydroxide or a tertiary amine.

Other methods of dispersing the polyurethane polymer into water are detailed in Dieterich, "Aqueous Emulsions, Dispersions and Solutions of Polyurethanes, Synthesis and Properties", *Progress in Organic Coatings*, 9 (1981) pp 281-340, copyright Elsevier Sequiod S.A., Lausanne.

In order to achieve the requisite branching in the isocyanate prepolymer it is very important that at least one of the reactants utilized in the preparation of the isocyanate prepolymer have a functionality of greater than two. This can be achieved in various ways, for example, the isocyanate containing prepolymer can be prepared from ingredients comprising a diisocyanate and a polyol or mixture of polyols having a hydroxyl functionality of greater than two. Additionally, of course, the ingredients preferably comprise a material containing anionic salt groups such that the resultant polyurethane can be made water dispersible. Alternatively, the isocyanate containing prepolymer can be prepared from ingredients comprising a triisocyanate or a mixture of triisocyanate and diisocyanate in conjunction with a polyol or mixture of polyols having a hydroxyl functionality of at least two. Once again, the prepolymer is preferably prepared such that it contains anionic salt groups so as to facilitate dispersion of the polymer into water. Moreover, the isocyanate containing prepolymer can be prepared from ingredients comprising a diisocyanate and a polyol or mixture of polyols having a hydroxyl functionality of greater than two. For example, one such polyol can be prepared from the polyesterification of components comprising a dihydroxycarboxylic acid and a diol. In this case, the dihydroxycarboxylic acid is preferably dimethylolpropionic acid.

In a preferred embodiment of the present invention the isocyanate containing prepolymer is prepared from ingredients comprising a diisocyanate and a polyol or mixture of polyols having a hydroxyl functionality of greater than two in conjunction with a material containing active hydrogens as well as ionic solubilizing groups. The materials containing ionic solubilizing groups have been detailed above and the preferred material of these is dimethylolpropionic acid. Examples of polyols having hydroxyl functionality of greater than two are glycerol, trimethylolethane, trimethylolpropane, pentaerythritol, as well as polyoxyethylene and polyoxypropylene derivatives of triols and tetrols. Polyols containing polycaprolactone segments can also be utilized. These polyols can be prepared from reaction of a cyclic lactone such as epsilon-caprolactone with a polyol having hydroxyl functionality of greater than two such as trimethylolpropane and in addition dimethylolpropionic acid.

It should be understood that the hydroxyl groups and ionic salt groups can be introduced into the polyurethane polymer through the use of different reactants or alternatively the source of these groups can be a single material.

In addition to the polyols having a hydroxyl functionality of greater than two, difunctional polyols or diols can also be used. As has been stated above, these diols can be utilized with a higher polyisocyanate, such as a triisocyanate or they can be utilized in admixture with polyols having a hydroxyl functionality of greater than two. Both low molecular weight materials and high molecular weight materials and mixtures of high and low molecular weight materials can be utilized. Examples of suitable low molecular weight diols are those having a molecular weight of less than 400, usually in the range of about 60 to 250. Specific examples include alkylene polyols containing from 2 to 8 carbon atoms such as ethylene glycol, 1,4-butanediol and neopentyl glycol. Examples of high molecular weight materials are polymeric polyols which have molecular weights of at least 400 and usually within the range of about 400 to 3,000. The most suitable polymeric polyols include linear polyether diols, polyester diols, and hydroxyl containing polycaprolactones as well as hydroxyl containing acrylic interpolymers including mixtures of these materials. Linear polyester diols including polycaprolactone diols are preferred.

Examples of polyether polyols are polyalkylene ether polyols which have the following structural formula:

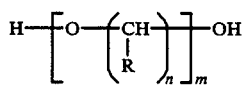

where the substituent R is hydrogen or low alkyl including mixed substituents and n is typically from 2 to 6 and m is from 2 to 100 or higher. Examples are poly(oxytetramethylene) glycols and poly(oxyethylene) glycols.

Examples of polyester polyols are those prepared by polyesterification of organic polycarboxylic acids or anhydrides thereof with organic polyols. Polyols used in preparing the polyester include alkylene glycols such as ethylene glycol, 1,4-butanediol, neopentyl glycol and trimethylolpropane including mixtures thereof.

The acid component of the polyester consists primarily of monomeric carboxylic acids or anhydrides having about 2 to 36 carbon atoms per molecule. The acid may be acrylic or cyclic including cycloaliphatic and aromatic polycarboxylic acids. Among the acids which can be used are phthalic acid, tetrahydrophthalic acid, hexahydrophthalic acid, adipic acid and maleic acid including mixtures of acids. Where acids are referred to above, it is understood that anhydrides of those acids which form anhydrides can be used in place of the acid. Also, lower alkyl esters of acids such as dimethyl esters can be used.

Besides polyester polyols prepared from polybasic acids and polyols, polycaprolactone-type polyesters can also be employed. These products are formed from reaction of a cyclic lactone such as epsilon-caprolactone with a polyol such as ethylene glycol, diethylene glycol, trimethylolpropane and dimethylolpropionic acid including mixtures thereof. Such products are described in U.S. Pat. No. 3,169,945 to Hostettler.

Hydroxyl-containing acrylic polymers can also be employed. These products are described in U.S. Pat. No. 3,919,351 to Chang et al in column 2, lines 63 to column 3, line 60, the portions of which are hereby incorporated by reference.

The organic polyisocyanate which can be used can be an aliphatic including cycloaliphatic or an aromatic polyisocyanate or a mixture of the two. Diisocyanates are preferred, although, as has been stated above, in some embodiments, higher polyisocyanates such as triisocyanates can be utilized either in place of or in combination with diisocyanates. Examples of suitable polyisocyanates include 4,4'-diphenylmethane diisocyanate, toluene diisocyanate, 1,6-hexamethylene diisocyanate, isophorone diisocyanate, 4,4'-methylene-bis(cyclohexyl isocyanate), trimethylhexamethylene diisocyanate and 1,2,4-benzene triisocyanate. Isothiocyanates corresponding to the above described isocyanates where they exist can be employed as well as mixtures of materials containing both isocyanate and isothiocyanate groups.

The relative amounts of organic polyisocyanate and active hydrogen containing component which are reacted with one another to form the isocyanate containing prepolymer are such that the resulting polymer has a urethane content of at least 6 percent by weight, preferably at least 10 percent by weight and more preferably from about 20 to about 60 percent by weight, the percentages by weight being based upon the weight of urethane linkage per total weight of polymer. By urethane is meant not only the reaction of isocyanate and hydroxyl, i.e.,

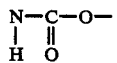

but also includes the reaction of isocyanate and other active hydrogens such as primary and secondary amino and thiol. In the preparation of the substantially branched isocyanate containing prepolymer the organic polyisocyanate and active hydrogen containing component are typically reacted at temperature of from about 40° to 100° C. for a period of time within the range of from about 2 to about 10 hours. Although not necessary, if desired the reaction can be conducted in the presence of a catalyst such as tertiary amines or an organo tin compound such as dibutyltin dilaurate, dibutyltin dioctoate, dibutyltin oxide and dibutyltin diacetate.

The reaction is usually conducted under an inert atmosphere such as nitrogen. Generally an organic solvent is utilized to facilitate reaction and control the viscosity of the prepolymer. Suitable solvents for the prepolymer are those which are nonreactive towards isocyanate groups and preferably the solvent is at lest partially miscible with water. Examples of solvents include ketones like methyl ethyl ketone, methyl isobutyl ketone and acetone; ester solvents like ethyl acetate and butyl acetate; ethers and amide solvents like dimethylformamide and N-methyl-2-pyrrolidone. Preferably amide solvents are utilized herein. Suitable solvents for the final polymer product which are reactive towards isocyanate groups may be added immediately before the prepolymer is dispersed, during dispersion or after dispersion. The solvents for the final polymer product should be water-soluble if they are added after dispersion; for example, ketones and alcohols.

Hydrocarbon solvents can be added to the predispersed polymer in order to control foaming which may occur during the dispersion step as well as in formulating coating compositions using these dispersions. Preferably such as solvent additive is utilized and one such preferred material is ISOPAR G which is a mixture of isoparraffins, commercially available from Exxon.

When a solvent is utilized it should be present in an amount sufficient to reduce the viscosity of the prepolymer to the required level, at a moderate temperature, i.e., up to 150° C. to effect adequate dispersion. If desired excess solvent can be utilized and then subsequently removed however, the use of excess solvent is not preferred. Generally the solvent is used in an amount of up to 30 percent and preferably from about 5 to 10 percent, the percentages based on the total amount of organic solvent and water.

As has been discussed above, the aqueous polyurethane dispersion is prepared from the reaction of a substantially branched isocyanate containing prepolymer with a polyamine having primary and/or secondary amino groups. This can be done in different ways. In one embodiment the substantially branched isocyanate containing prepolymer is first prepared. Dispersion of the prepolymer into a predominantly aqueous phase is accomplished by addition of amine to the prepolymer before adding the prepolymer to the water or amine can be present in the aqueous phase. Reaction of the prepolymer with polyamine can be accomplished by having the polyamine present in the water or it can be added subsequent to the dispersion. Examples of suitable chain extending diamines having primary and/or secondary amino groups, include hydrazine, substituted hydrazine and hydrazine reaction products, various alkamolamines such as diethanol amine, alkylene diamines such as ethylene diamine, propylene diamine and hexamethylene diamine; branched polyamines such as tetraethylene pentamine, triethylene tetraamine, diethylene triamine, tris(2-aminoethyl)amine and various polyoxyalkylene amines which are commercially available from Texaco under the trademark JEFFAMINE.

The claimed aqueous polyurethane dispersions can be prepared at a total solids content in water of from about 10 percent to about 40 percent, preferably 15 percent to 30 percent, more preferably 20 percent to 25 percent.

A very important feature of the dispersions of the present invention is that the isocyanate prepolymer is substantially branched. Branched isocyanate prepolymers are preferred because they provide for optimum metallic pigment orientation, and provide optimum strike in resistance of the basecoat without the need for special additives. The optimum strike-in resistance can be particularly seen when the claimed basecoats are used with a high solids clear topcoat such as those disclosed in allowed application Ser. No. 1,304, filed Jan. 8, 1987 entitled "Crosslinkable Compositions Containing Polyepoxides and Polyacid Curing Agents" and also the compositions disclosed in U.S. Pat. No. 4,650,718 to Simpson et al.

Also, branched prepolymers provide for optimum flexibility in the coating making the coating useful for both elastomeric and metallic parts in the substrate, i.e., a universal basecoat. Preferably for use as a universal coating, a free film of the polyurethane will have a tensile strength of greater than 200 and usually within the range of 1,000 to 10,000 psi and elongations of at least 40 and more preferably from 75 to 200 percent as determined according to ASTM D639-72.

Besides the aqueous polyurethane dispersion, the basecoat composition additionally can comprise other resinous ingredients such as aminoplast resins, e.g., water-dilutable melamine resin. Aminoplast condensates are obtained from the reaction of formaldehyde with an amine or an amide. The most common amines or amides are melamine, urea or benzoguanamine, and are preferred. However, condensates with other amines and amides can be employed, for example aldehyde condensates of diazines, triazoles, guanidines, guanamines and alkyl and aryl-substituted ureas and alkyl and aryl-substituted melamines and benzoguanamines. Some examples of such compounds are N,N-dimethylurea, N-phenylurea, dicyandiamide, formoguanamine, acetoguanamine, 6-methyl-2,4-diamino-1,3,5-triazine, 3,5-diaminotriazole, triaminopyrimidine, 2,6-triethyl-triamine-1,3,5-triazine and the like.

While the aldehyde employed is not often formaldehyde, other aldehydes such as acetaldehyde, crotonaldehyde, benzaldehyde and furfuryl may be used.

The aminoplast contains methylol or similar alkylol groups and preferably at least a portion of these alkylol groups are etherified by reaction with an alcohol to provide organic solvent-soluble resins. Any monohydric alcohol can be employed for this purpose including such alcohols as methanol, ethanol, butanol and hexanol.

Preferably, the aminoplasts which are used are melamine-, urea- or benzoguanamine-formaldehyde condensates etherified with an alcohol containing 1 to 4 carbon atoms such as methanol, ethanol, butanol or mixtures thereof. When used in the basecoat compositing, the aminoplast is present in amounts of about 1 to 50, usually 10 to 30 percent by weight based on weight of polyurethane dispersion and aminoplast.

In one embodiment the basecoat composition additionally comprises a further aqueous based active hydrogen containing film forming polymer. Preferably this additional polymer is an aqueous based acrylic polymer. Aqueous based acrylic polymers are described more fully below.

Both water-soluble thermoplastic and thermosetting acrylic resins can be prepared. They can be readily made by employing conventional acrylic polymerization techniques. Because of the wide variety of ethylenically unsaturated monomers available, both anionic and cationic polymers can be produced.

Anionic water-soluble acrylics can be commonly produced by copolymerizing functional monomers such as maleic anhydride, methacrylic acid, acrylic acid or itaconic acid with other monomer combinations. This gives pendant carboxylic groups which can be neutralized with ammonia or amines to give water-soluble polymers. Cationic water-soluble polymers can be produced by using the dialkyl amino methacrylates or acylates. Other methods could use the epoxy group of glycidyl methacrylate or acid groups reacted with dialkyl amino alcohols.

The basecoat composition generally comprises from about 5 percent by weight to about 80 percent by weight, the percentages based on the total weight of the composition. When the film forming polymer of the basecoat is an aqueous based acrylic polymer as little as from 5 percent to 20 percent of urethane dispersion provides the desired strike in resistance and flop.

In a further embodiment the basecoat composition of the claimed invention can comprise, in addition to the aqueous polyurethane dispersion, a solvent based active hydrogen containing film forming polymer. Preferably, this additional polymer is a solvent based polyester polyol prepared at a high solids content of at least 30 percent.

The basecoat composition also contains color pigments. The use of metallic flake pigments is preferred for the production of "glamour metallic" finishes for automobile bodies. Proper orientation of the metallic pigments results in a lustrous shiny appearance with excellent flop, distinctness of image and high gloss. As was stated above, flop is the visual change in brightness or lightness of a metallic coating with a change in viewing angle, that is, a change from 90 to 180 degrees. The greater the change, that is, from a light to dark appearance, the better the flop. When a coating has good flop, the coating accentuates the lines of a curved surface such as an automobile body. Examples of suitable metallic pigments include, in particular, aluminum flake, copper bronze flake and mica.

Besides the metallic pigments, the base coating compositions of the present invention can contain non-metallic color pigments.

In general, the pigment is incorporated into the coating composition in amounts of about 1 to 80 percent by weight based on weight of coating solids. The metallic pigment is employed in amounts of about 0.5 to 25 percent by weight of the aforesaid aggregate weight.

If desired, the basecoat composition can additionally contain other materials well known in the art of formulating surface coatings such as surfactants, flow control agents, thixotropes, fillers, anti-gassing agents, organic co-solvents, catalysts and other additives.

A variety of antigassing additives are suitable for use in the present invention. Orthophosphoric acid and alkyl esters of phosphoric acid are quite suitable as are non-phosphorous containing treatment agents such as dimer acids. Also useful are the materials disclosed in GB 2 163 767, namely the reaction product of (i) a compound containing in the molecule the grouping

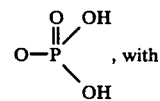, with (ii) one or more compounds which contain in the molecule at least one epoxide group and at least one of which also contains in the molecule at least one aromatic or alicyclic group.

In a preferred embodiment of the claimed invention it is preferred to use as an antigassing additive a phosphated acrylic polymer prepared by reacting phosphoric acid with an epoxy-functional acrylic polymer. Typically the phosphated acrylic polymer is derived from reacting phosphoric acid with an epoxy-functional acrylic polymer in a mole ratio of about 0.5 to 4:1 of the phosphoric acid to the epoxy-functional acrylic polymer based on moles of phosphorous per epoxy group. The epoxy-functional acrylic polymers which are useful can be prepared by copolymerizing an epoxy-functional monomer such as, for example, glycidyl methacrylate with another copolymerizable monomer selected such that it will provide a non-cyclic pendant group containing more than six carbon atoms, and preferably about 12 or more carbon atoms in a hydrocarbyl group as an alkyl group, for example, lauryl methacrylate. Other copolymerizable monomers can also be included. The aforesaid antigassing additive is disclosed in detail in U.S. patent application Ser. No. 130,922, entitled IMPROVED WATER-BASED COATING COMPOSITIONS CONTAINING ALUMINUM PIGMENTS AND ANTIGASSING AGENTS, filed even date herewith and also assigned to PPG Industries, Inc.

The basecoat compositions of the present invention can be applied to various substrates to which they adhere. The compositions can be applied by conventional means including brushing, dipping, flow coating, spraying and the like, but preferably they are applied by spraying. The usual spray techniques and equipment for air spraying and electrostatic spraying are utilized. Coatings of the present invention can be applied over a variety of substrates including wood, metals, glass, cloth, plastic, foam and including elastomeric substrates. They are particularly useful for application over both metal and elastomeric substrates, and as mentioned above, can be applied over both metallic and elastomeric parts of the substrate such as are found on automobiles.

During application of the basecoat composition to the substrate, a film of the basecoat is formed on the substrate. Typically, the basecoat thickness will be about 0.1 to 2, preferably 0.1 to 1.5 mils.

After the basecoat composition is applied to the substrate, a film is formed on the surface of the substrate. This is achieved by driving water out of the basecoat film by heating or simply by an air drying period. Preferably, the heating is of limited duration and only sufficient to ensure that the topcoat composition can be applied to the basecoat composition without any tendency of the topcoat to mix with or dissolve the basecoat, i.e., "striking in". Suitable drying conditions will depend on the ambient humidity but in general a drying time of from about 1 to 5 minutes at a temperature of from 77° F. to 175° F. (25° C. to 79° C.) will be adequate to ensure that mixing of the two coats is prevented. At the same time, the basecoat film is adequately wetted by the clear topcoat composition so that satisfactory intercoat adhesion is obtained. Also, more than one basecoat and multiple topcoats may be applied to develop the optimum appearance. Usually, between coats, the previously applied basecoat or topcoated is flashed, that is, exposed to ambient conditions, for about 1 to 20 minutes It should be understood that if desired the basecoat and topcoat compositions can be applied "wet-on-wet". That is, basecoat composition is applied to substrate followed by the topcoat composition and then a single baking or drying step is utilized to cure the composite coating.

The topcoat compositions can be applied to the substrate by any of the conventional techniques given above. Spray application is preferred since this gives the best gloss. Any of the known spray methods can be used such as compressed air spraying, electrostatic spraying and either manual or automatic methods are suitable.

After application of the topcoat composition to the basecoat, the coated substrate is heated to contemporaneously harden the film-forming material of the topcoat and/or that of the basecoat. During cure the solvents are driven off and the film former of the topcoat and/or basecoat is crosslinked with the aid of any crosslinking agents present. The heating or curing operation is usually carried out at a temperature in the range of from 160° F. to 350° F. (71° C. to 177° C.) however lower or higher temperatures can be used depending upon the temperature necessary for the crosslinking mechanism being used. In certain instances, air drying may be acceptable.

The thickness of the topcoat is usually from about 1 to 5, preferably 1.2 to 3 mils.

The clear topcoat composition comprises a film-forming polymer and usually a diluent including volatile solvents and reactive diluents well known in the art. The film-forming polymer can be selected from a wide variety of polymers and may be either thermoplastic or thermosetting in nature. In one embodiment the polymer is of an acrylic type which is particularly useful for automotive finishes. These are polymers or copolymers of one or more alkyl esters of acrylic or methacrylic acid, optionally together with other ethylenically unsaturated monomers. Suitable acrylic esters include methyl methacrylate, butyl methacrylate and 2-ethylhexyl acrylate. Other suitable copolymerizable monomers include styrene and acrylonitrile. Where the acrylic polymer is of the thermosetting type, there should be present suitable functional monomers which can result in crosslinking. Examples would include hydroxyl containing acrylic monomers such as hydroxyethyl methacrylate and hyroxypropyl methacrylate and acid containing acrylic monomers such as acrylic acid and methacrylic acid. These materials can be crosslinked with a curing agent such as an aminoplast condensate or a polyisocyanate. Examples of suitable aminoplasts are those described above.

Polyisocyanates and blocked polyisocyanates can also be used as curing agents. Examples of suitable polyisocyanates include monomeric polyisocyanates such as toluene diisocyanate and 4,4'-methylene-bis-(cyclohexyl isocyanate), isophorone diisocyanate and isocyanate prepolymers such as the trimers of monomeric polymeric polyisocyanates such as those mentioned above. The polyisocyanate can be optionally blocked. Examples of suitable blocking agents are those materials which are capable of unblocking at elevated temperatures such as lower aliphatic alcohols such as methanol, oximes such as methyl ethyl ketoxime, and lactams such as caprolactam. Blocked isocyanates can be used to form stable one-package systems. Polyfunctional isocyanates with free isocyanate groups can be used to form two-package room temperature curable systems. In a two package system, of course, the isocyanate is present in one package and the active hydrogen containing material is present in a second package.

Besides the acrylic polymers, polyesters can also be used in the formulation of the clear topcoat. Usually, these polyesters are polyester polyols which are designed to be cured with a polyisocyanate or with an aminoplast resin as mentioned above. The polyesters are formed by the polyesterification of an organic polycarboxylic acid or its functional equivalent thereof with an organic polyol. Among the acids which can be used are phthalic acid, terephthalic acid, tetrahydrophthalic acid, hexa-hydrophthalic acid, azelaic acid and dimerized fatty acid including mixtures. Examples of suitable polyols are ethylene glycol, 1,4-butanediol, neopentyl glycol, trimethylpentandiol and trimethylolpropane including mixtures. Also, polycaprolactone-type polyesters may be employed which are formed from reaction of a cyclic lactone such as epsilon-caprolactone with a polyol or a hydroxy acid such as ethylene glycol and dimethylolpropionic acid.

Particularly preferred for use as a clear topcoat in the claimed method are high solids clear coating compositions such as the clear coating compositions described in U.S. Pat. No. 4,650,718 to Simpson et al which is herein incorporated by reference and also allowed U.S. patent application Ser. No. 1,304 entitled "Crosslinkable Compositions Containing Polyepoxides and Polyacid Curing Agents", filed Jan. 8, 1987 which is also incorporated by reference herein. When these high solids clear topcoating compositions are utlized in conjunction with the claimed basecoating compositions, optimum strike-in resistance is achieved.

Polyurethanes may also be used as the film-forming polymer in the topcoat composition. Particularly suitable are poly(ester-urethane) polyols which can be cured with an aminoplast or polyisocyanate as described above. The polyester polyol is usually first prepared and then reacted with the polyisocyanate. Among the polyesters which may be used are those mentioned above. The polyisocyanate can be aromatic, aliphatic and cycloaliphatic with aliphatic and cycloaliphatic being preferred because of their better ultraviolet light stability. Examples of polyisocyanates have been mentioned above. The polyurethane-based coating compositions are preferred because they can be applied to the basecoat over both the metallic and elastomeric parts of a substrate, i.e., universal clear coat. Examples of such polyurethane-based coating compositions are described in U.S. Pat. No. 4,485,228 and U.S. Pat. No. 4,540,766 both to Chang et al which are hereby incorporated by reference.

To be useful as a universal clear coat, the topcoat composition, when applied over the basecoat, should be flexible, yet somewhat hard and durable.

The flexibility of the coatings can be determined by coating an elastomeric substrate such as ⅛ inch thick thermoplastic polyurethane commercially available from Mobay Company as TEXIN 3202 and bending the coated substrate around a ¼-inch diameter (1.13 cm) mandrel with the coating side outwardly facing. After bending, the coating is examined for breaks and cracks. Testing can be conducted at room temperature, i.e., 70°-75° F., or at low temperature, i.e., cooling substrate to 0° F. before bending. When formulated for automotive use on elastomeric parts, the coatings of the present invention preferably exhibit no breaks or cracks when tested at 32° F. in the above-described manner, and more preferably exhibit no breaks or cracks when tested at 0° F.

The hardness of the coatings can be determined by the Sward method using a Sward rocker as described in ORGANIC COATINGS TECHNOLOGY, Payne, Vol. 1, 1965, pages 642–643. Cured coatings of the present invention preferably have a Sward hardness within the range of 10 to 40, more preferably 20 to 36. Testing for Sward hardness is done on coatings having a thickness of about 2 to 3 mils over steel panels.

A preferred topcoat composition is a two-package system based on a polyurethane polyol and a polyisocyanate curing agent. The compositions give a topcoat which is exceptionally smooth. Examples of two-pack polyurethane polyol/polyisocyanate systems are described in the aforementioned U.S. Pat. No. 4,485,228 to Chang et al.

As was mentioned above, the topcoat composition is preferably of high solids content and organic solvent based. Alternatively, the topcoat composition may, like the basecoat composition, be water based. If desired, both the color basecoat and the transparent topcoat can be formulated with the same aqueous based polyurethane binder. Examples of suitable organic solvents are aromatic materials such as toluene and xylene, esters such as 2-ethoxyethyl acetate, ketones such as methyl amyl ketone and alcohols such as n-butanol, and glycol monoethers such as 2-ethoxyethanol, 2-hexoxyethanol and the monobutyl ether of diethylene glycol.

By high solids is meant the coating composition is sprayable at a resin solids content of at least 35 percent, preferably at least 45 percent, and usually within the range of 37 to 60 percent by weight.

The sprayability is the maximum concentration of the resin solids in solution such that the resin can be atomized sufficiently to form a uniformly deposited coating. Above the maximum concentration, the spraying solution strings and gives a web-like spray pattern. The sprayability of the resin solids is determined by first dissolving the resin in a suitable solvent such as N-methyl pyrrolidone to a viscosity of about 500 to 1000 centipoises measured at 78° F. and then thinning with a mixture of 2 parts methyl ethyl ketone, 2 parts of n-butanol and 1 part of 2-ethoxyethyl acetate (all parts by volume) to the maximum spray solids. The sprayability is then determined on the thinned solutions using a spray gun such as an air suction spray gun operating at 60 psi with a No. 30 air cap.

The following examples are illustrative of the invention and are not intended to be limiting.

EXAMPLE I

This example illustrates the preparation of an aqueous polyurethane dispersion according to the present invention. The dispersion had a total solids content of 20 percent.

| Charge | Ingredients | Parts by Weight (grams) |
|---|---|---|
| I | ethylenediamine | 41.2 |
|  | dimethyl ethanol amine | 43.3 |
|  | deionized water | 2872 |
| II | NCO-prepolymer[1] | 1000 |

[1]This isocyanate prepolymer was prepared in the following manner:

| Charge | Ingredients | Parts by Weight (grams) |
|---|---|---|
| I | mixture of acid functional and hydroxyl functional polyesters[a] | 2937 |
|  | dimethylolpropionic acid | 495 |
|  | N—methyl-2-pyrrolidone | 1143 |
| II | N—methyl-2-pyrrolidone | 1292 |
| III | 2,2,4- and 2,4,4-trimethyl hexamethylene diisocyanate | 3729 |

<sup>a</sup>The mixture of acid functional and hydroxyl functional polyesters was prepared in the following manner:

| Ingredients | Parts by Weight (grams) |
|---|---|
| dimethylolpropionic acid | 942 |
| trimethylolpropane | 2874 |
| epsilon-caprolactone | 13765 |
| triphenyl phosphite | 19.3 |

A reactor vessel equipped with temperature control, condenser, and nitrogen inlet tube was charged with all of the ingredients listed above. The mixture was degassed and subsequently heated to 120° C. The mixture was held at 120° C. for approximately 7 hours and 15 minutes until infrared spectroscopy indicated the disappearance of the caprolactone peak. The resultant product had a total solids content determined at 150° C. for two hours of 99.1 percent; an acid value of 21.7; and a hydroxyl number of 221.7.

For preparing the NCO prepolymer, a suitably equipped reactor vessel was charged with (I), placed under nitrogen atmosphere and heated to about 65° C. to dissolve the dimethylolpropionic acid. The dimethylolpropionic acid did not completely dissolve thus Charge (II) was added and a homogeneous solution was obtained. The mixture was cooled to 40° C., Charge (III) was added and then the mixture was heated to 50° C. This was followed by a reaction exotherm to about 100° C. The reaction mixture was maintained at a temperature between 85° C. and 90° C. until a constant isocyanate equivalent weight was attained. The isocyanate equivalent weight of the prepolymer was 690.3.

The aqueous polyurethane dispersion was prepared as follows. A reactor vessel equipped with temperature control, nitrogen inlet tube, and condenser was charged with (I). Charge (II) was added slowly at a temperature of between 70° C. to 80° C. The extent of reaction was monitored by infrared spectroscopy (IR). The reaction was considered complete when the IR spectrum indicated that the isocyanate was consumed. The resultant dispersion was cooled to 45° C. and then filtered through a 50 micron mesh filter and poured into a container. The dispersion had a total solids content of 19.93 percent, a pH of 8.13 and a Brookfield viscosity of 45 centipoise measured using a number 3 spindle at 100 RPM. The milliequivalents of acid per gram of dispersion was 0.121 and the milliequivalents of base per gram of dispersion was 0.126.

EXAMPLE II

This example also illustrates the preparation of an aqueous polymer dispersion according to the present invention.

| Charge | Ingredients | Parts by Weight (grams) |
|---|---|---|
| I | ethylenediamine | 25.8 |
|  | dimethylethanolamine | 26.3 |
|  | deionized water | 1726.9 |
| II | NCO-prepolymer<sup>2</sup> | 600 |

<sup>2</sup>This isocyanate prepolymer was prepared in the following manner:

| Charge | Ingredients | Parts by Weight (grams) |
|---|---|---|
| I | PCP-0301<sup>b</sup> | 188 |
|  | polyester polyol<sup>c</sup> | 469 |
|  | N—methyl-2-pyrrolidone | 219 |
| II | dimethylolpropionic acid | 90 |
|  | N—methyl-2-pyrrolidone | 30 |
| III | 2,2,4- and 2,4,4-trimethylhexamethylene diisocyanate | 830 |
|  | N—methyl-2-pyrrolidone | 277 |
| IV | dibutyltin dilaurate | 0.5 |

<sup>b</sup>This is a polycaprolactone polyol which is commercially available from Union Carbide. The polyol has a molecular weight of 300 and a hydroxyl number of 561.
<sup>c</sup>This polyester polyol was prepared from 61.0 percent dodecanedioic acid, 8.7 percent of dimethylolpropionic acid, and 30.3 percent of neopentyl glycol. The polyester polyol had a number average molecular weight of 1864, an acid value of 42.7 and a hydroxyl value of 108.4.

For preparing the isocyanate prepolymer, a suitably equipped reactor vessel was charged with (I), placed under nitrogen atmosphere and heated to about 65° C. Charge (II) was then added and the reaction mixture cooled to approximately 50° C. followed by the addition of Charges (III) and (IV). The reaction exothermed to a temperature of about 100° C. so heating was momentarily discontinued. The reaction mixture was maintained at a temperature of about 90° C. until a constant isocyanate equivalent weight was obtained. 600 grams of prepolymer were removed and 14.3 grams of ISOPAR G were added to the remaining prepolymer. The isocyanate equivalent weight of the prepolymer was 663.2.

The aqueous polyurethane dispersion was prepared as follows. A reactor vessel equipped with temperature control, nitrogen inlet tube and condenser was charged with (I) and heated to 70° C. Charge (II) was then added slowly at approximately the same temperature. The extent of the reaction was monitored by IR. The reaction was considered complete when the IR spectrum indicated that the isocyanate was consumed. The resultant dispersion was cooled to about 40° C. and filtered through a 50 micron mesh filter and poured into a container. The dispersion had a total solids content of 19.6 percent, a pH of 8.36 and a Brookfield viscosity of 68 centipoise measured using a number 3 spindle at 100 RPM. The milliequivalents of acid per gram of dispersion was 0.118 and the milliequivalents of base per gram of dispersion was 0.126.

EXAMPLE III

This example illustrates the preparation of an aqueous polyurethane dispersion which is similar to that of Example I, above, with the exception that triethylene tetramine was used as the chain extender in place of ethylenediamine.

| Charge | Ingredients | Parts by Weight (grams) |
|---|---|---|
| I | dimethylethanolamine | 17.5 |
|  | deionized water | 1167 |
| II | NCO-prepolymer<sup>3</sup> | 400 |
| III | triethylene tetramine | 20.5 |

<sup>3</sup>This isocyanate prepolymer was prepared in the following manner:

| Charge | Ingredients | Parts by Weight (grams) |
|---|---|---|
| I | mixture of acid functional and hydroxyl functional polyesters<sup>d</sup> | 1194 |
|  | dimethylolpropionic acid | 201 |
|  | N—methyl-2-pyrrolidone | 465 |
| II | N—methyl-2-pyrrolidone | 525 |
| III | 2,2,4- and 2,4,4-trimethyl hexamethylene diisocyanate | 1516 |

<sup>d</sup>The mixture of acid functional and hydroxyl functional polyesters has been described above in footnote a.

For preparing the isocyanate prepolymer, a suitably equipped reactor vessel was charged with (I), placed under nitrogen atmosphere and heated to about 60° C. to dissolve the dimethylolpropionic acid. Some of this ingredient remained undissolved; therefore, Charge (II) was added. Once the dimethylolpropionic acid had dissolved, the mixture was cooled to 45° C. and Charge (II) was added. The reaction mixture was heated to a temperature of about 55° C. and the reaction exothermed to 65° C. The reaction mixture was then heated to 70° C. for approximately 30 minutes followed by heating to 90° C. for approximately 30 minutes. The reaction was considered complete when the isocyanate equivalent weight was constant. The isocyanate equivalent weight of the prepolymer was 691.4.

The aqueous polyurethane dispersion was prepared as follows. A reactor vessel equipped with temperature control, nitrogen inlet tube, condenser and addition funnel was charged with (I) at ambient temperature. Charge (II) was then added slowly followed by the dropwise addition of Charge (III). The reaction mixture exothermed to about 40° C. after the addition of Charge (III). The addition funnel was washed with 10 grams of deionized water which was combined into the reaction mixture. The resultant dispersion was allowed to cool to 32° C. over a one hour period and then filtered through a 50 micron mesh filter and poured into a container. The dispersion had a total solids content of 19.9 percent, a pH of 7.62 and a Brookfield viscosity of 29 centipoise measured using a number 3 spindle at 100 RPM. The milliequivalents of acid per gram of dispersion was 0.117 and the milliequivalents of base per gram of dispersion was 0.142.

EXAMPLE IV

The aqueous polyurethane dispersion of this example is similar to that of Example I with the exception that tetraethylene pentaamine was used in place of ethylenediamine.

| Charge | Ingredients | Parts by Weight (grams) |
|---|---|---|
| I | dimethylethanolamine | 17.6 |
|   | deionized water | 1166 |
| II | NCO prepolymer[4] | 400 |
| III | tetraethylene pentaamine | 20.8 |

[4]This isocyanate prepolymer has been described above in footnote 3.

The aqueous polyurethane dispersion was prepared in the following manner. A reactor vessel equipped with temperature control, nitrogen inlet tube and addition funnel was charged with (I) at ambient temperature. Charge (II) was added slowly followed by the addition of Charge (III). The reaction exothermed to about 40° C. after the addition of Charge (III). The addition funnel was washed with 10 grams of deionized water which was added to the reaction mixture. The resultant dispersion was filtered through a 50 micron mesh filter and poured into a container. The dispersion had a total solids content of 19.61, a pH of 7.72 and a Brookfield viscosity of 30 centipoise measured using a number 3 spindle at 100 RPM. The milliequivalents of acid per gram of dispersion was 0.118 and the milliequivalents of base per gram of dispersion was 0.153.

EXAMPLE V

This example illustrates the preparation of an aqueous polyurethane dispersion utilizing a polyoxyalkylene amine.

| Charge | Ingredients | Parts by Weight (grams) |
|---|---|---|
| I | JEFFAMINE T-403[5] | 14.2 |
|   | ethylene diamine | 8.2 |
|   | dimethyl ethanolamine | 11.5 |
|   | deionized water | 590 |
| II | NCO-prepolymer[6] | 267 |

[5]This polyoxyalkylene amine is commercially available from Texaco. It has a molecular weight of 403 and an amine equivalent weight of approximately 134.
[6]The isocyanate prepolymer was prepared in the following manner:

| Charge | Ingredients | Parts by Weight (grams) |
|---|---|---|
| I | mixture of acid functional and hydroxyl functional polyesters[e] | 1205 |
|   | dimethylolpropionic acid | 203 |
|   | N—methyl-2-pyrrolidone | 469 |
| II | 2,2,4- and 2,4,4-trimethyl hexamethylene diisocyanate | 1591 |
|   | N—methyl-2-pyrrolidone | 530 |
| III | dibutyltin dilaurate | 1.6 |

[e]The mixture of acid functional and hydroxyl functional polyesters was prepared as was described above in footnote a. This mixture had a hydroxyl number of 267.5 and an acid value of 22.5

For preparing the isocyanate prepolymer, a suitably equipped reactor vessel was charged with (I) and (II), placed under nitrogen atmosphere at 45° C. The reaction exothermed to 83° C. during which Charge (III) was added. The reaction continued to exotherm for a period of approximately one hour. The reaction mixture was heated to 90° C. and maintained at this temperature until a constant isocyanate equivalent weight was obtained. The isocyanate equivalent weight of the prepolymer was 691.3.

The aqueous polyurethane dispersion was prepared as follows. A reactor vessel equipped with temperature control and nitrogen inlet tube was charged with (I) with heating to 70° C. Charge (II) was then added slowly at the same temperature. The resultant dispersion was cooled to about 40° C. and filtered through a 50 micron mesh filter and poured into a container. The dispersion had a total solids content of 25.7. The milliequivalents of acid per gram of dispersion was 0.139 and the milliequivalents of base per gram of dispersion was 0.148.

EXAMPLE VI

In this Example an aqueous polyurethane dispersion was prepared using diethylene triamine as a chain extender with the chain extension being carried out immediately after dispersion of the polymer.

| Charge | Ingredients | Parts by Weight (grams) |
|---|---|---|
| I | dimethylethanolamine | 9.2 |
|   | deionized water | 605 |
| II | NCO-prepolymer[7] | 210 |
| III | diethylene triamine | 9.2 |

[7]This isocyanate prepolymer has been described above in footnote 3.

The aqueous polyurethane dispersion was prepared in the following manner. A suitably equipped reactor vessel having temperature control and addition funnel was charged with (I) at ambient temperature. Charge (II) was then added slowly to the mixture at ambient temperature. Charge (III) was then added dropwise and the addition funnel washed with 7 grams of deionized water which was combined into the reaction mixture. The resultant mixture exothermed to 40° C. The resultant dispersion was filtered through a 50 micron mesh filter and poured into a container. The resultant dispersion had a total solids content of 19.94 percent, a pH of 7.61 and a Brookfield viscosity of 30 centipoise measured using a number 3 spindle at 100 RPM. The milliequivalents of acid per gram of dispersion was 0.119 and the milliequivalents of base per gram of dispersion was 0.123.

EXAMPLE VII

| Charge | Ingredients | Parts by Weight (grams) |
|---|---|---|
| I | ethylene diamine | 16.5 |
|  | dimethylethanolamine | 15.8 |
|  | deionized water | 1150 |
| II | isocyanate prepolymer[8] | 400 |

[8]This isocyanate prepolymer was prepared in the following manner:

| Charge | Ingredients | Parts by Weight (grams) |
|---|---|---|
| I | OLIN T-600[f] | 367 |
|  | polyester polyol[g] | 458 |
|  | dimethylolpropionic acid | 88 |
|  | N—methyl-2-pyrrolidone | 305 |
| II | 2,2,4- and 2,4,4-trimethyl hexamethylene diisocyanate | 811 |
|  | N—methyl-2-pyrrolidone | 271 |
| III | dibutyltin dilaurate | 0.5 |

[f]This polypropylene polyol is commercially available from Olin Corp. It has a molecular weight of 600 and a hydroxyl value of 280.
[g]This polyester polyol was described above in footnote c.

The isocyanate prepolymer was prepared in the following manner. A suitably equipped reactor vessel was charged with (I) and heated to 65° C. for approximately a one hour period. Subsequently, heating was discontinued, Charge (II) was added and the mixture stirred for approximately 35 minutes. Charge (III) was then added followed by heating to a temperature of about 90° C. The reaction mixture was maintained at the same temperature until a constant isocyanate equivalent weight was obtained. The isocyanate equivalent weight of the prepolymer was 692.9.

The aqueous polyurethane dispersion was prepared in the following manner. A suitably equipped reactor vessel was charged with (I) and heated to a temperature of 70° C. Charge (II) was then added slowly at the same temperature and then heating was discontinued. The resultant dispersion was cooled to about 40° C. and filtered through a 50 micron mesh filter and poured into a container. The dispersion had a total solids content of 19.5 percent, a pH of 8.48 and a Brookfield viscosity of 40 centipoise measured using a number 3 spindle at 100 RPM. The milliequivalents of acid per gram of dispersion was 0.107 and the milliequivalents of base per gram of dispersion was 0.115.

EXAMPLE VIII

This example illustrates the preparation of an aqueous polyurethane dispersion similar to that of Example VI, above, except that the mixture of acid functional and hydroxyl functional polyesters was replaced by a single polymer containing both functionalities and the chain extending amine was different.

| Charge | Ingredients | Parts by Weight (grams) |
|---|---|---|
| I | dimethylethanolamine | 32.2 |
|  | deionized water | 1833 |
| II | NCO-prepolymer[9] | 715 |
| III | ethylenediamine | 28.5 |

[9]This isocyanate prepolymer was prepared in the following manner:

| Charge | Ingredients | Parts by Weight (grams) |
|---|---|---|
| I | acid functional polyester polyol[h] | 734 |
|  | dimethylolpropionic acid | 123 |
|  | N—methyl-2-pyrrolidone | 286 |
| II | 2,2,4- and 2,4,4-trimethyl hexamethylene diisocyanate | 933 |
|  | N—methyl-2-pyrrolidone | 311 |

[h]This acid functional branched polyester polyol was prepared in the following manner.

| Charge | Ingredients | Parts by Weight (grams) |
|---|---|---|
| I | dodecanedioic acid | 1840 |
| II | dimethylolpropionic acid | 200 |
| III | trimethylolpropane | 136 |
| IV | neopentyl glycol | 1248 |
| V | dibutyltin oxide | 2.0 |
| VI | triphenyl phosphite | 2.0 |

A reactor vessel equipped with thermometer, stirrer, nitrogen sparge inlet tube and distillation apparatus was charged with all of the ingredients listed above except that only 840 grams of the dodecanedioic acid was charged.
The reaction mixture was heated to 110° C. and then the remaining 1000 grams of dodecanedioic acid was added. The reaction mixture was distilled at a temperature of 170° C. until an acid value of 26.5 was reached. The contents of the flask were poured into a container.

For the preparation of the isocyanate prepolymer, a reactor vessel equipped with thermometer, stirrer and nitrogen inlet tube was charged with (I) and the vessel heated to a temperature of approximately 70° C. Charge (II) was then added and was accompanied by a reaction exotherm to 105° C. Heating was discontinued until the exotherm subsided and then the reaction mixture was heated to 90° C. The reaction mixture was maintained at this temperature until a constant isocyanate equivalent weight was obtained. The isocyanate equivalent weight of the resultant prepolymer was 715.6.

For the preparation of the aqueous polyurethane dispersion a suitably equipped reactor vessel was charged with (I) and Charge (II) was added slowly at ambient temperature. This addition was accompanied by a temperature increase to 41° C. When the addition of Charge (II) was complete, Charge (III) was added dropwise and was accompanied by an exotherm to 50° C. The resultant dispersion was cooled to about 40° C. and filtered through a 50 micron mesh filter and poured into a container. The dispersion had a total solids content of 21.63 percent, a pH of 8.56 and a Brookfield viscosity of 35 centipoise using a number 3 spindle at 100 RPM. The milliequivalents of acid per gram of dispersion was 0.134 and the milliequivalents of base per gram of dispersion was 0.168.

EXAMPLE IX

This example is a comparative example which demonstrates the unexpected and surprising advantages which result from using a branched isocyanate prepolymer in the preparation of an aqueous polyurethane dispersion which is used in the basecoat composition of a multilayered coated article. The basecoat composition which was prepared utilizing the branched isocyanate prepolymer had much better strike-in resistance as exhibited by the better flop than the basecoat composition prepared with a linear isocyanate prepolymer.

Basecoating Composition Prepared Utilizing Branched Isocyanate Prepolymer

| Charge | Ingredients | Parts by Weight (grams) |
|---|---|---|
| I | pigment paste[10] | 143.3 |
| II | ethylene glycol monohexyl ether | 15.0 |
| III | Cymel 325[11] | 25.0 |
| IV | water | 7.5 |
|  | aqueous acrylic resin[12] | 101.9 |
| V | water | 7.5 |
|  | aqueous polyurethane dispersion of Example I | 99.0 |

[10]This pigment paste was prepared in the following manner:

| Ingredients | Parts by Weight (grams) |
|---|---|
| neutralized phosphatized epoxy resin[i] | 7.4 |
| ethylene glycol monohexyl ether | 20.0 |
| aluminum pigment | 30.8 |
| water | 30.0 |
| aqueous acrylic resin of footnote 12 | 55.1 |

[i]This neutralized, phosphatized epoxy resin was prepared in the following manner:

| Ingredients | Parts by Weight (grams) |
|---|---|
| phosphatized epoxy resin[j] | 76 |
| diisopropanolamine (75 percent in water) | 35 |

[j]This resin was prepared in the following manner:

| Charge | Ingredients | Parts by Weight (grams) |
|---|---|---|
| I | phosphoric acid (85 percent) | 388.99 |
| II | ethylene glycol monobutyl ether acetate | 502.34 |
| III | EPON 828[k] | 1611.67 |
|  | ethylene glycol monobutyl ether acetate | 795.19 |
| IV | ethylene glycol monobutyl ether acetate | 76.78 |
| V | ethylene glycol monobutyl ether acetate | 54.84 |
| VI | ethylene glycol monobutyl ether acetate | 70.20 |

[k]The diglycidyl ether of bisphenol A commerically available from Shell Chemical Company.

A suitably equipped reactor vessel was charged with (I) and placed under a nitrogen blanket. Charge (II) was added rapidly with rapid agitation. The reaction mixture was heated to 110° C. for about one hour. Charge (III) was then added over a two hour period followed by the addition of Charge (IV). The reaction mixture was held at 110° C. for two hours and then a sample was tested for solubility in dimethylethanolamine. (4 grams of reaction mixture [resin] was mixed with 0.5 grams of dimethylethanolamine. This was mixed well and then 1.75 grams of deionized water was added. If the resultant solution was clear the resin was soluble.) The test sample was clear following the test, thus Charge (V) was added and stirred until cool. Charge VI was added to bring the Gardner Holdt viscosity to Y. The resultant resin had a weight average molecular weight of 754 as determined by GPC using a polystyrene standard; a total solids content of 61.5 percent at 150° C. for two hours. The milliequivalents of acid per gram of resin was 1.849.
The neutralized phosphatized epoxy resin had a resin solids content of 38.1 percent, amine solids content of 23.7 percent, 2.8 percent water and 30.4 solvent.
The paste was prepared by slurrying the ingredients together as detailed below:
The paste was prepared by slurrying the ingredients together in the following manner. To the first two listed ingredients, which were premixed, was added the aluminum pigment. These ingredients were stirred together well until the pigment was well wetted. Finally, the water and the aqueous acrylic resin, which had been premixed, were added to this mixture.
[11]This partially methylolated melamine formaldehyde condensate is commercially available from American Cyanamid.
[12]This acrylic resin had a total solids content of 26.83 percent and an acid value of 16.9. It was prepared from 8.40 percent glacial acrylic acid. 29.99 percent styrene; 29.04 percent butyl acrylate; 18.52 percent butyl methacrylate; 4.58 percent methy methacrylate; 9.46 percent hydroxypropyl acrylate; 1.70 percent t-butyl peroxyacetate and 0.10 percent t-butyl perbenzoate. The solvent content was 73.17 percent and it was made up of 2.03 percent dimethylethanolamine; 84.41 percent deionized water and 13.56 percent ethylene glycol monobutyl ether.

The basecoating composition was prepared by combining the ingredients listed above in the following fashion: Charges (I), (II) and (III) were combined followed by the addition of Charge (IV) which was premixed and subsequently Charge (V) was added with stirring.

Basecoating Composition Prepared Using Linear Isocyanate Prepolymer

| Charge | Ingredients | Parts by Weight (grams) |
|---|---|---|
| I | pigment paste of footnote 10 above | 143.3 |
|  | ethylene glycol monohexyl ether | 15.0 |
| III | Cymel 325 | 25.0 |
| IV | water | 7.5 |
|  | aqueous acrylic resin of footnote 12 above | 101.9 |
| V | water | 7.5 |
|  | aqueous polyurethane dispersion prepared using linear isocyanate prepolymer[13] | 60.6 |

[13]This aqueous polyurethane dispersion prepared from a linear isocyanate prepolymer had a total solids content of 33 percent, a solvent content of 67 percent and an acid value of 10.6. It was prepared from:
40.72 percent methylene bis(4-cyclohexyl isocyanate) commercially available from Mobay as HYLENE W.
27.30 percent of a polyester polyol having a number average molecular weight of 2000, a hydroxyl number of 56 and is commercially available from Witco as FORMREZ 55-56.
22.39 percent of a polyether polyol having a number average molecular weight of 2000, a hydroxyl number of 56 and is commercially available from Quaker Oats as POLYMEG 2000.
9.16 percent dimethylolpropionic acid
3.11 percent ethylene diamine
1.26 percent hydroxyethyl ethyleneimine
0.49 percent neopentyl glycol
0.44 percent butanol and
0.04 percent dibutyltin dilaurate.
The solvent content was made up of 2.88 percent dimethylethanolamine; 15.10 N—methyl-2-pyrrolidone and 82.02 percent deionized water. The pH was 8.8, the milliequivalents of acid per gram of dispersion was 0.190 and the milliequivalents of base per gram of dispersion was 0.259.

Clearcoating Composition

| Ingredients | Parts by Weight (grams) |
|---|---|
| TINUVIN 328[14] | 3.0 |
| SOLVESSO 100[15] | 16.5 |
| ethylene glycol monobutyl ether | 3.0 |
| melamine resin[16] | 50.7 |
| LUWIPAL 013[17] | 32.4 |
| BAYSILON OL[18] | 0.15 |
| acrylic resin[19] | 152.1 |

[14]This ultraviolet light stabilizer is commericially available from Ciba-Geigy.
[15]Aromatic petroleum distillate which is commercially available from Chem Central.
[16]This polymeric butylated melamine is available from Monsanto.
[17]This butylated polymeric melamine is commercially available from BASF.
[18]This silicone surfactant is commercially available from Bayer.
[19]This acrylic resin was prepared from 29.2 percent styrene, 21.0 percent 2-ethylhexyl acrylate, 19.0 percent hydroxyethyl -continued methacrylate, 1.8 percent acrylic acid, 29.0 percent butyl methacrylate, 0.80 percent azo bis-(isobutyrylnitrile) and 3.0 percent tert-dodecylmercaptan. The resin had a solids content of 62.2 percent in a mixture of 73.5 percent xylene and 26.5 percent isobutanol.

The clearcoating composition was prepared by combining the ingredients with mild agitation. The composition was reduced with the addition of a mixture of xylene and butyl acetate at a 50:50 ratio by volume until a Ford Cup viscosity of 25 seconds was achieved using a number 4 Ford Cup.

Prior to application, each of the basecoating compositions detailed above were reduced with water.

The basecoating composition prepared from a branched isocyanate prepolymer was reduced as follows: 150 grams of the basecoat composition was mixed with 24 grams of water the yield a number 4 Ford cup viscosity of 45.2 seconds. This was allowed to stand for 24 hours. Then 2 grams of water were added to yield a number 4 Ford cup viscosity of 31.2 seconds. The spray solids were 25.6 percent.

The basecoating composition prepared from the linear isocyanate prepolymer was reduced as follows: 150 grams of the baseocat composition was mixed with 46 grams of water to yield a number 4 Ford cup viscosity of 36.5 seconds. After standing for 24 hours the viscosity drifted to 30.6 seconds. It was applied at that viscosity. The spray solids were 25.4 percent.

Each of the basecoats was applied by SPRAYMATION brand automatic spray equipment onto metal panels primed with UNI-PRIME ® electrodeposition primer coating composition commercially available from PPG Industries, Inc. Two coats of basecoat were applied within one minute of each other with a one minute air flash between coats. The basecoats were then flashed (prebaked) in three different ways. One set of panels was flashed for 5 minutes at 150° F. (66° C.), another set of panels was flashed for 6 minutes at 180° F. (82° C.) and a third set was flashed for 15 minutes at room temperature (25° C.). The clearcoat was then hand spray applied and the panels were flashed (prebaked) for ten minutes followed by baking at 285° F. (141° C.) for 30 minutes. The results are set out below.

| Prebake Type | Dry Film Thickness (mils) basecoat/clearcoat | Flash | Gloss 20° | DOI | Visual Flop |
|---|---|---|---|---|---|
| Aqueous Polyurethane Dispersion Prepared from Branched Isocyanate Prepolymer ||||||
| 1 | 0.38/1.75 | 5'/66° C. | 96 | 80 | 1 |
| 2 | 0.38/1.75 | 6'/82° C. | 92 | 75 | 1 |
| 3 | 0.38/1/75 | 15'/25° C. | 92 | 75 | 1 |
| Aqueous Polyurethane Dispersion Prepared from Linear Isocyanate Prepolymer ||||||
| 4 | 0.4/1.85 | 5'/66° C. | 91 | 80 | 1 |
| 5 | 0.4/1.85 | 6'/82° C. | 93 | 80 | 2 |
| 6 | 0.4/1.85 | 15'/25° C. | 94 | 80 | 2 |

Gloss was measured using a Gardner glossmeter.
DOI was measured using a DORI-GON spectrophotometer from Hunter.
Flop was measured by visually observing the change in brightness or lightness with a change in viewing angle from 90 degrees to 180 degrees. The greater the change the better the flop. A rating of 1 was better than 2.

Thus, the basecoat compositions prepared using an aqueous polyurethane dispersion prepared from a branched isocyanate prepolymer had better visual flop than those prepared using a linear prepolymer. The other properties were comparable.

The films were also evaluated on a multiangle colorimeter to note the change in darkness to lightness with an increase in viewing angle. In this test, the panels were tested with one being a reference to the other. The panel with the linear isocyanate prepolymer was measured and used as a reference for the comparison.

The panels were evaluated using a DATACOLOR GK 111 multiangle colorimeter manufactured by Zeiss for DATACOLOR.

The instrument measures, among several parameters, the change from darkness to lightness (dL) with a change in viewing angle, the total color change (dE) and an index factor which is also measuring the difference in lightness to darkness. The (dE) and (dL) values are reported in C.I.E. LAB coordinates.

The tolerance of the instrument is set at 1.0 which is defined as the acceptable index factor range in which one views two colors to be the same. The tolerance has been experimentally determined. A panel is rejected for color match if the tolerance exceeds 1.0.

The more negative the (dL), the darker the appearance, the more positive the (dL), the lighter the appearance.

Flop is optimum when the (dL) changes from light to dark as the viewing angle increases. If the face of the cured coated panel is dark and (dL) changes from dark to light, soak-in of the topcoat into the basecoat has occurred.

The data is presented below.

Panels Prepared Using Basecoating Composition
Prepared with Branched Isocyanate Prepolymer
Prebake 1
(Panel with linear isocyanate prepolymer is reference.)

| Angle | Sample is | Sample is | dL | dE | Index | Tolerance Factor |
|---|---|---|---|---|---|---|
| 25 | accepted |  | 0.1 | 0.2 | 0.2 | 1.0 |
| 35 | accepted | dark | −0.2 | 0.2 | 0.1 | 1.0 |
| 45 | accepted | dark | −0.7 | 0.7 | 0.4 | 1.0 |
| 55 | accepted | dark | −0.8 | 0.9 | 0.7 | 1.0 |
| 65 | accepted | dark | −0.9 | 0.9 | 0.7 | 1.0 |

Panel showed better flop than the reference but not visually measurable with the naked eye.

Prebake 2
(Panel with linear isocyanate prepolymer is reference)

| 25 | accepted | light | 0.7 | 0.7 | 0.3 | 1.0 |
|---|---|---|---|---|---|---|
| 35 | accepted | dark | −1.4 | 1.4 | 0.6 | 1.0 |
| 45 | check | dark | −2.3 | 2.4 | 1.0 | 1.0 |
| 55 | rejected | dark | −2.6 | 2.7 | 1.3 | 1.0 |
| 65 | rejected | dark | −2.4 | 2.4 | 1.2 | 1.0 |

Panel shows better flop compared to the reference but only visually measurable by naked eye at an angle greater than 45°.

Prebake 3
(Panel with linear isocyanate prepolymer is reference)

| 25 | accepted | light | 1.2 | 1.2 | 0.5 | 1.0 |
|---|---|---|---|---|---|---|
| 35 | accepted | dark | −0.2 | 0.3 | 0.2 | 1.0 |
| 45 | accepted | dark | −1.4 | 1.4 | 0.6 | 1.0 |
| 55 | accepted | dark | −1.9 | 1.9 | 0.9 | 1.0 |
| 65 | accepted | dark | −2.0 | 2.0 | 1.0 | 1.0 |

Panel shows better flop compared to reference but not visually measurable by the naked eye.

It should also be noted that for Prebakes 2 and 3 the data shows the color of the panels to be slightly lighter on the face than the linear isocyanate prepolymer reference panel.

EXAMPLE X

This Example is a comparative example which also demonstrates the outstanding soak-in resistance (strike-in resistance) of an aqueous polyurethane basecoating composition prepared from a branched isocyanate prepolymer. In this example, a coated article is prepared using a preferred basecoating composition according to the claimed invention and a preferred high solids clear coating composition. This coated article is compared to one prepared using an aqueous polyurethane basecoating composition prepared from a linear isocyanate prepolymer and topcoated with the same high solids clear coat utilized above.

The basecoating compositions have been set out above in Example IX. The clear coating composition is detailed below.

| High Solids Clear Top Coating Composition | |
|---|---|
| Ingredients | Parts by Weight (grams) |
| TINUVIN 328 | 3.0 |
| TINUVIN 292[20] | 1.0 |
| polybutyl acrylate | 0.4 |
| poly(2-ethyl hexyl acrylate)[21] | 0.5 |
| ARMEEN DM 12D[22] | 4.0 |
| solvent blend[23] | 31.0 |
| ERL 4299[24] | 19.2 |
| epoxy containing acrylic polymer[25] | 31.0 |
| Ester Diol 204-methyl-hexa-hydrophthalic anhydride half ester[26] | 40.6 |
| | 12.0 |
| acid functional acrylic resin[27] | 2.4 |
| EMERSOL 875[28] | 2.4 |
| RESIMENE 717[29] | 12.5 |
| fumed silica | 12.5 |

[20]This ultraviolet light stabilizer is commercially available from Ciba Geigy Corporation.
[21]This is commercially available from Monsanto Corporation as Multiflow.
[22]N,N—dimethyldodecylamine from AKZO Chemical.
[23]This solvent blend was prepared from 25 parts by volume of orthohexyl acetate and 75 parts by volume of methyl isobutyl ketone.
[24]Bis(3,4-epoxycyclohexylmethyl)adipate from Union Carbide Corporation.
[25]This epoxy functional acrylic was prepared from 40 percent glycidyl methacrylate, 33 percent methyl methacrylate, 2 percent styrene and 25 percent butyl acrylate using an initiator mixture of 5 percent 2,2'-azobis (2-methylbutyronitrite) and 2.5 percent tertiary-butyl perbenzoate. This resin was prepared at 60 percent theoretical solids in xylene.
[26]This polyacid half-ester of 1-(3-hydroxy-2,2-dimethylpropyl)-3-hydroxy-2,2-dimethylpropionate (Ester Dol 204) and methylhexahydrophthalic anhydride was prepared from the following mixture of ingredients:

| Ingredients | Parts by Weight (grams) |
|---|---|
| Ester Diol 204 | 2550.0 |
| Methylhexahydrophthalic anhydride | 4116.0 |
| Methyl isobutyl ketone | 1666.5 |
| Ethanol | 666.6 |

The Ester Diol 204 and 1466.5 grams of the methyl isobutyl ketone were charged to a reaction vessel and heated under a nitrogen atmosphere to 115° C. The methylhexahydrophthalic anhydride was added over a ninety minute period. The reaction mixture was then held at 115° C. for four hours. The reaction mixture was then cooled to 100° C. followed by the addition of ethanol (to react with residual anhydride) and heating the reaction mixture to reflux and holding for two hours. The reaction mixture was stripped to a pot temperature of 125° C. The reaction mixture was then adjusted to 80 percent solids with methyl isobutyl ketone.
[27]This acid functional acrylic having an acid value of 95.3 and prepared at 74.9 percent solids in methyl isobutyl ketone was prepared from 30 percent 2-ethylhexyl acrylate, 15 percent styrene, 15 percent methacrylic acid, 14.63 percent butyl methacrylate, 0.37 percent methyl methacrylate and 25 percent of an acid functional polyester (polyester prepared from 2 moles methyl hexahydrophthalic anhydride and 1 mole 1,6-hexanediol at 70 percent solids in methyl isobutyl ketone and having an acid value of 182).
[28]Isosteric acid from Emery Chemical Company.
[29]Melamine formaldehyde condensate from Monsanto Company.

The formulated clear coating composition had a resin solids content of 57.4 percent and a No. 4 Ford cup viscosity of 26.4 seconds.

Each of the basecoats was spray applied by SPRAYMATION automatic spray equipment onto metal panels at a thickness of 0.33 to 0.34 mils. The basecoats were prebaked for 3 minutes a 180° F. (82° C.) and then the clear coat was spray applied onto each panel in the same way at a film thickness of 1.95 to 2.00 mils. The clear coats were air flashed for 5 minutes and then the composite panels were baked for 30 minutes at 250° F. (121° C.).

The films were evaluated for gloss, DOI and visual observation of flop. The films were also evaluated on a multiangle colorimeter to note the change in darkness to lightness with an increase in viewing angle. In this test the panels were also tested with one being a reference to the other. The panel with the branched isocyanate prepolymer was measured and used as the reference for the comparison. These tests have all been described above in Example IX.

The data is set out below.

| Basecoat | Dry Film Thickness (mils) (Basecoat/Clearcoat) | Gloss | DOI | Visual Flop |
|---|---|---|---|---|
| Aqueous Polyurethane Dispersion-Branched Isocyanate Prepolymer | 0.34/1.95 | 85 | 85 | 2 |
| Aqueous Polyurethane Dispersion-Linear Isocyanate Prepolymer | 0.33/2.00 | 90 | 85 | 1 |

| Panel Prepared Using Basecoat with Linear Isocyanate Prepolymer and High Solids Clear (Panel with branched isocyanate prepolymer is reference) | | | | | | |
|---|---|---|---|---|---|---|
| Viewing Angle | Sample is | Sample is | dL | dE | Index | Tolerance Factor |
| 25 | rejected | dark | −14.4 | 14.4 | 5.4 | 1.0 |
| 35 | rejected | dark | −7.2 | 7.2 | 2.8 | 1.0 |
| 45 | accepted | dark | −0.8 | 0.9 | 0.6 | 1.0 |
| 55 | rejected | dark | 4.1 | 4.1 | 1.8 | 1.0 |
| 65 | rejected | dark | 7.1 | 7.1 | 3.3 | 1.0 |

The data demonstrates that the topcoat soaked into the basecoat. The initial color of the linear isocyanate prepolymer compared to the branched isocyanate prepolymer reference at a 25° angle was dark; this dark face is indicative of soak-in. The color change (flop) is from dark to light, also indicative of soak-in. This phenomenon is called a reverse flop. This is further evidenced by the dL, dE and Index values.

What is claimed is:

1. A method of forming a multilayered coating on a substrate, comprising:
   (I) applying to the surface of a substrate an aqueous based film forming composition comprising color pigments and an aqueous polyurethane dispersion comprising an effective amount of the reaction product of:
      (a) a substantially branched, isocyanate containing prepolymer; and
      (b) a polyamine having primary and/or secondary amino groups;
   (II) applying a clear film forming composition over the basecoat of step (I);
   (III) allowing the clear composition of step (II) to at least partially dry or cure to form a transparent topcoat over said basecoat.

2. A method of forming a multilayered coating on a substrate, comprising:
   (I) applying to the surface of a substrate an aqueous based film forming composition comprising color pigments and an aqueous polyurethane dispersion comprising an effective amount of the reaction product of:
      (a) a substantially branched, isocyanate containing prepolymer; and
      (b) a polyamine having primary and/or secondary amino groups;
   (II) allowing the composition applied in step (I) to at least partially dry or cure to form a basecoat on the substrate surface;
   (III) applying a clear film forming composition over the basecoat of step (II);
   (IV) allowing the clear composition of step (III) to at least partially dry or cure to form a transparent topcoat over said basecoat.

3. The method of claim 1 wherein the isocyanate containing prepolymer is prepared from ingredients comprising a diisocyanate and a polyol having a hydroxyl functionality of greater than 2.

4. The method of claim 3 wherein the polyol also contains anionic salt groups.

5. The method of claim 4 wherein the anionic salt group is a carboxylic acid group.

6. The method of claim 1 wherein the isocyanate containing prepolymer is prepared from ingredients comprising a triisocyanate and a polyol having a hydroxyl functionality of at least 2.

7. The method of claim 1 wherein the isocyanate containing prepolymer is prepared from ingredients comprising a diisocyanate and a polyol having a hydroxyl functionality of greater than 2 which is prepared from the polyesterification of components comprising a dihydroxycarboxylic acid and a diol.

8. The method of claim 7 wherein the dihydroxycarboxylic acid is dimethylolpropionic acid.

9. The method of claim 1 wherein the polyurethane polymer of the dispersion has a urethane content of at least 6 percent by weight, the percentage by weight being based on the weight of urethane linkage per total weight of polymer.

10. The method of claim 3 wherein the isocyanate containing prepolymer is prepared from ingredients comprising a polyisocyanate and trimethylolpropane, epsilon-caprolactone, and dimethylolpropionic acid.

11. The method of claim 10 wherein the polyisocyanate is a diisocyanate.

12. The method of claim 1 wherein the polyamine is a diamine.

13. The method of claim 1 wherein the basecoat composition additionally comprises an aminoplast resin.

14. The method of claim 1 wherein the color pigment is aluminum flake.

15. The method of claim 1 wherein the composition is applied by spraying.

16. The method of claim 1 wherein the basecoat composition additionally comprises a further aqueous based active hydrogen containing film-forming polymer.

17. The method of claim 16 wherein the further film forming polymer is an aqueous based acrylic polymer.

18. The method of claim 1 wherein the basecoat composition additionally comprises a solvent based active hydrogen containing film forming polymer.

19. The method of claim 18 wherein the solvent based active hydrogen containing film forming polymer is a high solids polyester polyol.

20. The method of claim 1 wherein the clear topcoat composition comprises a film forming active hydrogen containing polymer and a crosslinker selected from aminoplasts and polyisocyanates.

21. The method of claim 20 wherein the film forming active hydrogen containing polymer is an acrylic polyol.

22. The method of claim 20 wherein the film forming active hydrogen containing polymer is a polyurethane polyol.

23. The method of claim 1 wherein the topcoat composition is aqueous based.

24. The method of claim 1 wherein the topcoat composition is solvent based.

25. The method claim 1 in which the substrate comprises both metallic and elastomeric parts and the basecoat composition is applied to both parts.

26. The method of claim 1 in which the topcoat composition is a one-package system and the crosslinker is an aminoplast resin.

27. The method of claim 24 in which the topcoat composition is sprayable at a resin solids content of at least 40 percent by weight.

28. A method of forming a multilayered coating on a substrate comprising both metallic and elastomeric parts, comprising:
   (I) applying to the surface of a substrate an aqueous based film forming composition comprising color pigments and an aqueous polyurethane dispersion comprising an effective amount of the reaction product of:
      (a) a substantially branched, isocyanate containing prepolymer; and
      (b) a polyamine having primary and/or secondary amino groups;
   (II) applying to said basecoat of step (I) a clear film-forming composition of a two-package organic solvent based system comprising a polyurethane polyol and a polyisocyanate;
   (III) allowing the clear composition of step (II) to at least partially cure to form a transparent topcoat over the basecoat.

29. The method of claim 28 comprising the additional step of allowing the composition in step (I) to at least partially dry or cure to form a basecoat on the surface of the substrate prior to applying the clear film-forming composition of the next step.

30. The method of claim 28 in which the basecoat composition contains an aminoplast resin.

31. An article coated by the method of claim 1.

32. An article coated by the method of claim 28.

33. The method of claim 1 wherein the isocyanate containing prepolymer is derived from at least 20 milliequivalents of a material having a functionality greater than 2.

* * * * *